Feb. 14, 1928.
C. H. VON GLAHN
CHEESE SLICER
Filed Feb. 8, 1927    2 Sheets-Sheet 1
1,659,340
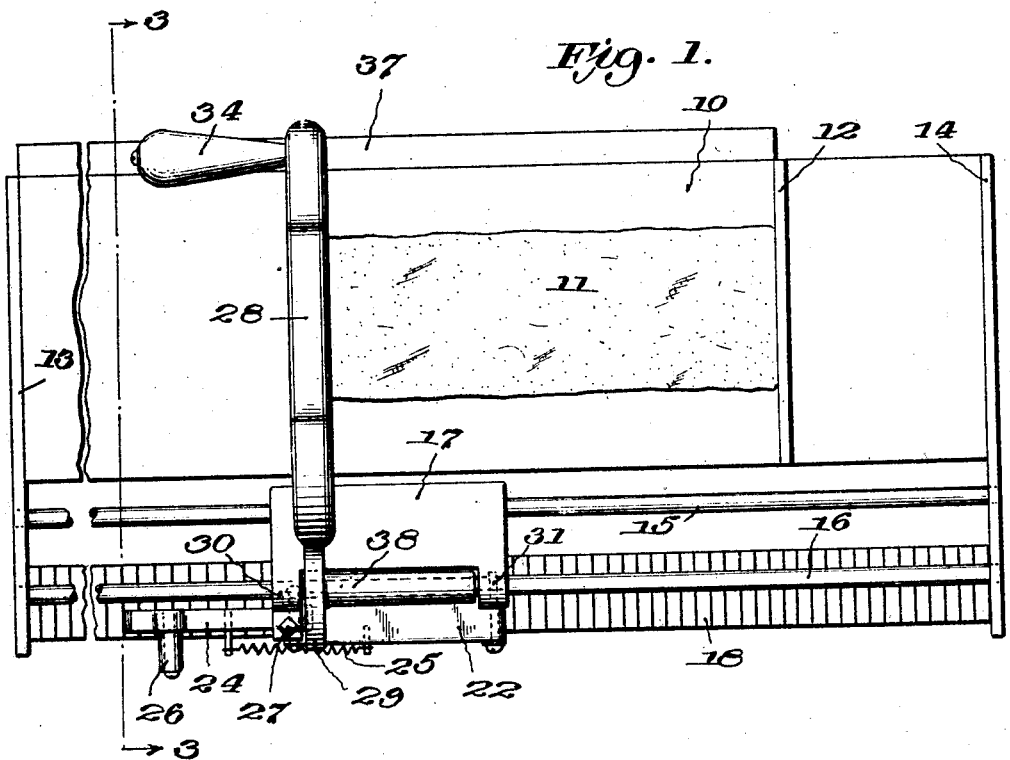
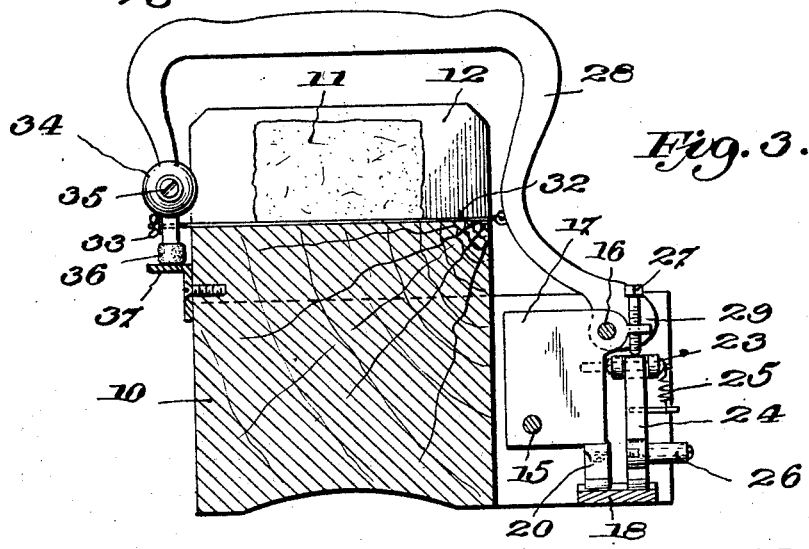
Inventor
Charles H. von Glahn,
By
Attorney

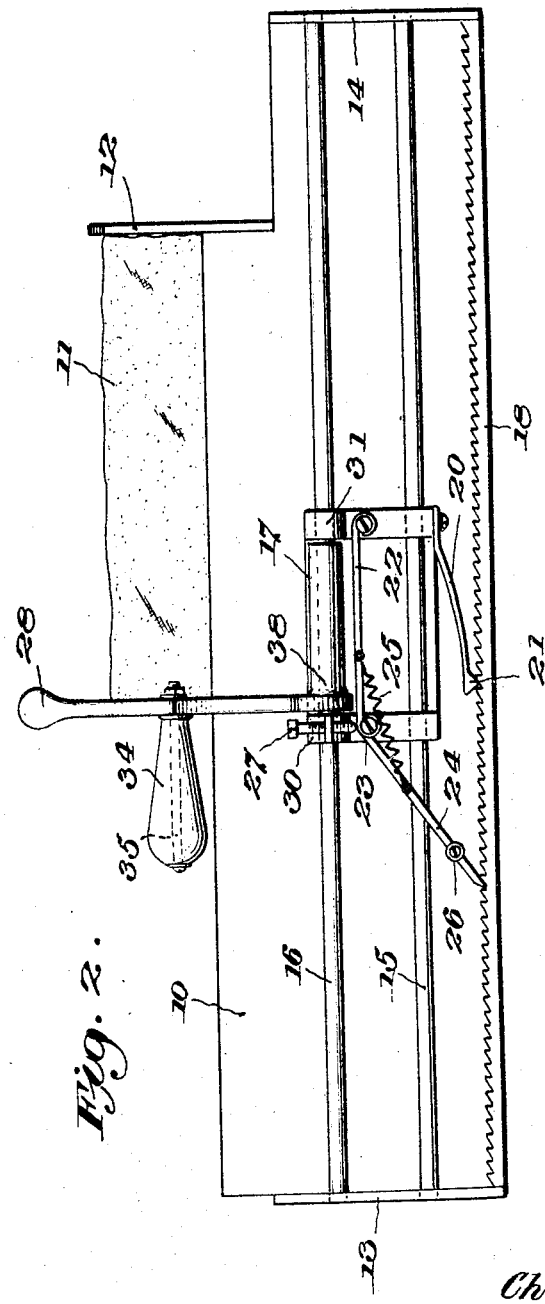

Patented Feb. 14, 1928.

1,659,340

UNITED STATES PATENT OFFICE.

CHARLES H. von GLAHN, OF BROOKLYN, NEW YORK.

CHEESE SLICER.

Application filed February 8, 1927. Serial No. 166,693.

This invention relates to slicers for cheese, butter, and similar plastic or semiplastic materials, and has for an object to provide an improved apparatus whereby the material may be cut into slices of predetermined thickness.

A further object of the invention is to provide an apparatus having an oscillating cutter which is automatically advanced to the material to be sliced.

The invention is illustrated in the accompanying drawings, in which:

Fig. 1 is a plan view of a slicer embodying the invention;

Fig. 2 is a side elevation of the slicer shown in Fig. 1;

Fig. 3 is a section on the line 3—3 of Fig. 1.

The device comprises a supporting member 10, which may advantageously be made of a block of wood, the upper surface being adapted to receive the material to be sliced, which is indicated at 11. A stop 12 is secured to member 10, which member is cut away to the rear of the stop as indicated in Fig. 2. End plates 13 and 14 project laterally from the ends of member 10 and support two guide rods 15 and 16 upon which is slidably mounted a block 17. A rack 18 extends below block 17 and is secured to the end plates, and a leaf spring 20 extends from the block and engages the rack by means of a tooth 21, thereby normally holding the block stationary, but allowing movement thereof in either direction if sufficient force is applied to cause the tooth to ride over the teeth of the rack.

A link 22 is pivoted to block 17 at one end and at its other end 23 has a detent 24 pivotally secured thereto and engaging the rack 18, the link and detent being inclined to each other and forming a toggle mechanism, the operation of which will be more fully described. A coiled spring 25 extends between link 22 and detent 24 in a manner to tend to cause them to fold together. A stud 26 may be provided to facilitate lifting the detent out of engagement with the rack, and an adjusting screw 27, threaded in a flange of the block 17, limits the upward movement of pivot 23.

A cutter frame 28 has one of its ends 29 formed with a sleeve 38, whereby the frame is pivotally mounted on rod 16 between flanges 30 and 31 of the block 17. The end 29 is formed into a cam which is adapted to engage and depress link 22 when the cutter frame is raised. The cutter frame is provided with a suitable cutting element such as a steel band or cutting wire 32, the tension of which is maintained by a thumbnut 33 in known manner. A handle 34 is rotatably mounted on a bolt 35 which is secured to the cutter frame. A rubber tip 36 may be provided at the end of the cutter frame, to bear against an angle bar 37 to eliminate noise and normally hold the cutting element out of contact with the member 10. Cutter frame 28, and the members carried thereby, make up the cutter.

The operation is as follows: When the cutter is raised, it pivots about rod 16, and cam 29 moves pivot 23 downward, causing the block 17 and the cutter to be advanced, the tooth 21 in this operation riding over the teeth of rack 18, the extent of such movement depending upon the position of adjusting screw 27. The cutter being now positioned, the operator moves it downwardly, cutting a slice of the material and releasing members 22 and 24, which are restored to their former position by spring 25. The detent 24 rides over the teeth of rack 18 in this operation.

Having described my invention, what I claim as new and desire to secure by Letters Patent of the United States is:

1. In a slicer having a frame, and an oscillating cutter mounted therein; means operable by the upward movement of the cutter to advance the cutter relative to said frame.

2. In a slicer having a material-supporting member and an oscillating cutter cooperating therewith; a toggle mechanism actuated by the oscillation of said cutter and operative to advance said cutter relative to said material supporting member.

3. In a slicer having an elongated material-supporting member and a pivoted cutter cooperating therewith; a rack extending along said material-supporting member, a toggle mechanism connected to said cutter and engaging said rack, and a cam on said cutter constructed and arranged to actuate said toggle mechanism to thereby advance said cutter relative to said material-supporting member.

4. In a cheese slicer, a material-supporting member, a slidable member mounted adjacent said material-supporting member, a cutter pivoted to said slidable member and movable therewith, a rack extending adjacent said slidable member, toggle mechanism secured to said slidable member and engaging said rack, and an element fixed to said cutter and adapted to engage and actuate said toggle mechanism to thereby advance the slidable member relative to the material-supporting member.

5. In a cheese slicer, a material-supporting member, a member slidably mounted adjacent said material-supporting member, a cutter frame pivoted to said slidable member, a cutting element in said frame, a rotatable handle on said cutter frame, a rack extending adjacent said slidable member, toggle mechanism secured to said slidable member and engaging said rack, an element fixed to said cutter frame and adapted to engage and actuate said toggle mechanism to thereby advance the slidable member relative to the material-supporting member, and means for normally holding said cutting element out of contact with said material-supporting member.

6. In a cheese slicer, a material-supporting member, a member slidably mounted adjacent said material-supporting member, a cutter pivoted to said slidable member and adapted to be oscillated in the slicing operation, and means actuated by the oscillation of said cutter to advance said slidable member along said material-supporting member.

7. In a cheese slicer, a material-supporting member, a member movably mounted adjacent said material-supporting member, a cutter connected to said movable member and adapted to be oscillated in the slicing operation, and means actuated by the oscillation of said cutter to advance said movable member along said material-supporting member in step-by-step manner.

In testimony whereof I affix my signature.

CHARLES H. von GLAHN.